United States Patent
Ouyang et al.

(10) Patent No.: US 12,189,557 B2
(45) Date of Patent: Jan. 7, 2025

(54) BUS-BASED COMMUNICATION SYSTEM, SYSTEM-ON-CHIP AND METHOD THEREFOR

(71) Applicant: Black Sesame Technologies Inc., San Jose, CA (US)

(72) Inventors: Bangjian Ouyang, Shenzhen (CN); Wei Qin, Shenzhen (CN); Zhitao Wang, Shenzhen (CN)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/512,477

(22) Filed: Oct. 27, 2021

(65) Prior Publication Data
US 2024/0248865 A1    Jul. 25, 2024

(30) Foreign Application Priority Data

Oct. 29, 2020  (CN) .......................... 202011179160.9

(51) Int. Cl.
*G06F 13/362* (2006.01)
*G06F 13/16* (2006.01)
*G06F 13/42* (2006.01)

(52) U.S. Cl.
CPC ...... *G06F 13/3625* (2013.01); *G06F 13/1673* (2013.01); *G06F 13/4204* (2013.01)

(58) Field of Classification Search
None
See application file for complete search history.

(56) References Cited

U.S. PATENT DOCUMENTS

| 2008/0119991 A1 | 5/2008 | Hattori |
| 2019/0014574 A1* | 1/2019 | Shao ....................... H04L 12/40 |
| 2019/0019638 A1* | 1/2019 | Humphreys ........ G06F 11/2736 |

FOREIGN PATENT DOCUMENTS

| CN | 1794635 A | 6/2006 |
| CN | 101282301 A | 10/2008 |

(Continued)

OTHER PUBLICATIONS

Salman A. AlQahtani; A novel hybrid scheme of interrupt enabling—disabling and polling (EDP) for high-speed computer networks; Dec. 4, 2007; 2007 International Symposium on Communications and Information Technologies.

(Continued)

*Primary Examiner* — Farley Abad
*Assistant Examiner* — Dayton Lewis-Taylor
(74) *Attorney, Agent, or Firm* — Timothy T. Wang; Ni, Wang & Massand, PLLC (57) ABSTRACT

The disclosure provides a bus-based communication system, which comprises a bus controller, a first buffer, a bus redundant controller, a second buffer and a comparator. The bus controller is configured to receive a bus input signal and send a bus output signal. The first buffer is connected with the bus controller in parallel to receive the bus input signal, and is configured to output the bus input signal after a preset time, wherein the preset time is two or more duty cycles of the bus controller. The bus redundant controller is connected to an output terminal of the first buffer and configured to receive a bus output signal delayed by at least T cycles output by the first buffer and output a bus redundant output signal.

20 Claims, 6 Drawing Sheets

(56) References Cited

FOREIGN PATENT DOCUMENTS

| | | |
|---|---|---|
| CN | 103139060 A | 6/2013 |
| CN | 110861600 A | 3/2020 |
| CN | 110901568 A | 3/2020 |

OTHER PUBLICATIONS

Bo Hao; Research on In-vehicle CAN network management and communication technology Based on IPv6; Sep. 15, 2013; Database of China Excellent Master's Thesis.

* cited by examiner

といった具合に...

BUS-BASED COMMUNICATION SYSTEM, SYSTEM-ON-CHIP AND METHOD THEREFOR

FIELD OF THE INVENTION

The current disclosure relates to communication technology, and more particularly, to a bus-based communication system.

BACKGROUND OF THE INVENTION

The number of electronic/electrical systems (E/E) in automobiles is increasing, and some premium automobiles have more than 70 ECUs (Electronic Control Units). When the system fails, the system must be switched into safe mode or degraded mode, so as to avoid casualties caused by system failure. Therefore, in the functional safety design of automotive electronic/electrical systems, hazard analysis and risk assessment will be carried out in the early stage to identify the ASIL (Automotive Safety Integration Level) of the system. There are four levels of ASIL, namely A, B, C and D, in which A is the lowest level and D is the highest level. According to the current market demand, most vehicles are required to reach ASIL D. CAN bus is widely used in vehicles. Conventional configuration of CAN bus in vehicles can reach ASIL B. However, as mentioned above, the industry now hopes that the safety of electronic/electrical functions of vehicles can reach ASIL D level.

Therefore, it is necessary to improve the current CAN bus configuration.

SUMMARY OF THE INVENTION

The disclosure provides an improved bus configuration scheme. According to one aspect of the disclosure, a bus-based communication system is provided, which includes a bus controller, a first buffer, a bus redundant controller, a second buffer and a comparator. The bus controller is configured to receive a bus input signal and send a bus output signal. The first buffer is connected in parallel with the bus controller to receive the bus input signal, and is configured to output the bus input signal after a preset time, wherein the preset time is two or more duty cycles of the bus controller. The bus redundant controller is connected to an output terminal of the first buffer and configured to receive a bus output signal delayed by at least T cycles output by the first buffer and output a bus redundant output signal. The second buffer is configured to receive the bus output signal sent by the bus controller and output the bus output signal delayed by the preset time. A comparator is respectively connected with the second buffer and the bus redundant controller, and is configured to receive the bus redundant output signal and the bus output signal delayed by the preset time, and generate a signal representing abnormality when the bus redundant output signal is different from the received bus output signal delayed by the preset time.

In the bus-based communication system, optionally, the signal representing the abnormality of the controller is an interrupt signal generated by the comparator.

In the bus-based communication system, optionally, the preset time is two or more duty cycles of the bus controller.

In the bus-based communication system, optionally, the bus redundant controller is a redundant backup of the bus controller.

In the bus-based communication system, optionally, the bus is a CAN bus. Further, the bus is a CAN FD bus.

The current disclosure also provides a method for monitoring a bus communication system, which is applied to a bus-based communication system comprising a bus controller, a first buffer, a second buffer and a comparator, wherein the first buffer is connected in parallel with the bus controller, the bus redundant controller is arranged between the first buffer and the comparator, and the second buffer is arranged between the bus controller and the comparator. The method for monitoring the bus communication system comprises: the bus controller and the first buffer respectively receiving bus input signals; the first buffer outputting the bus input signal after delaying a preset time, wherein the preset time is two or more duty cycles of the bus controller; the bus redundant controller receiving the bus input signal delayed by the preset time sent by the first buffer and sending a bus redundant output signal; the second buffer receiving the bus output signal and outputting the bus output signal delayed by the preset time; the comparator receiving the bus redundant output signal and the bus output signal delayed by the preset time output by the second buffer, and comparing them; When the comparison result is inconsistent, the comparator generates a signal representing abnormality.

According to a further aspect of the current disclosure, it also provides a system-on-chip including the bus-based communication system described herein.

According to some aspects of the current disclosure, it also provides a vehicle including the bus-based communication system or the system-on-chip described herein.

BRIEF DESCRIPTION OF THE DRAWINGS

These and other features, aspects and advantages of the current disclosure will become better understood when the following detailed description is read with reference to the accompanying drawings, in which similar reference numerals denote similar parts throughout, and in which.

DETAILED DESCRIPTION OF THE INVENTION

In order to make the above objects, features and advantages of the current disclosure more obvious and understandable, the specific embodiments of the current disclosure will be described in detail with reference to the accompanying drawings. In the following description, numerous specific details are set forth in order to provide a thorough understanding of the current disclosure. However, the current disclosure can be implemented in many other ways different from those described here, and those skilled in the art can make similar improvements without departing from the connotation of the current disclosure, so the current disclosure is not limited by the specific embodiments disclosed below.

Briefly, CAN FD (CAN with Flexible Data rate; CAN FD) is an upgraded version of traditional CAN, which is compatible with traditional CAN bus. Compared with traditional CAN bus, CAN FD supports variable speed and longer data length.

In all examples of this disclosure, the CAN FD bus will be taken as an example to illustrate the improvement of this disclosure to the bus safe transmission for communication. It should be understood that the method described in this disclosure can also be applied to communication systems based on traditional CAN bus and communication systems based on other buses such as LIN bus. Further, in this disclosure, the improvement and beneficial effects of safe transmission of CAN FD bus are described in combination with vehicle safety. It should be understood that the embodiments given in this disclosure are also applicable to the application of CAN FD bus in other equipment and/or industrial scenes such as industrial robots and smart homes.

Figure 1:
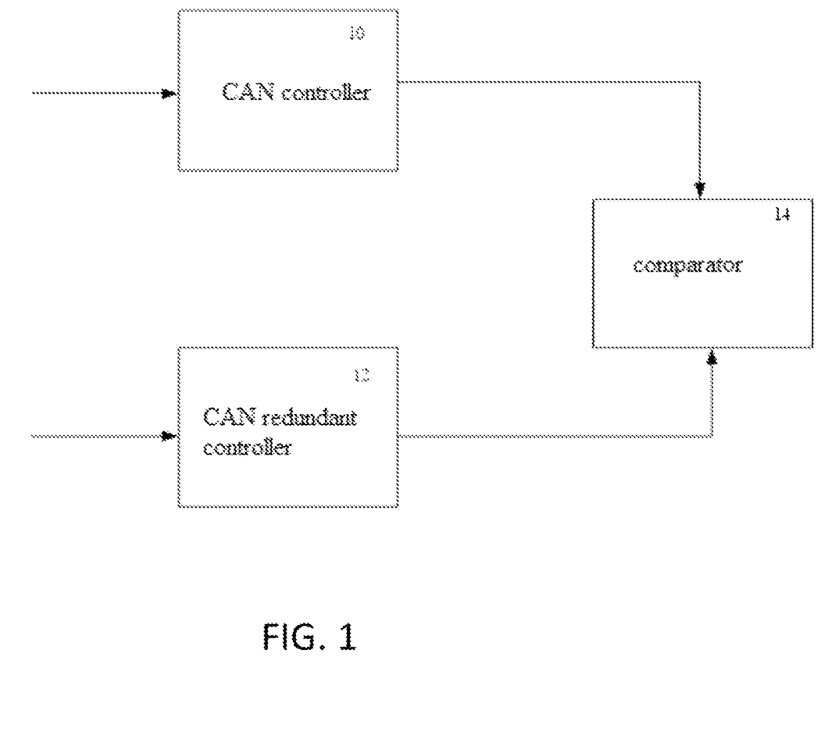
FIG. 1 is an example communication system structure based on CAN bus, which is widely used in communication scenarios based on CAN bus at present.

FIG. 1 is an example structure of a communication system based on CAN bus, which is widely used in communication scenarios based on CAN bus at present. As shown in the figure, the communication system based on CAN bus includes a CAN controller 10, a CAN redundant controller 12, and a comparator 14. The CAN controller 10 receives and sends data. The CAN redundant controller 12 is configured to operate in the same operating mode as the CAN controller 10. The data sent by the CAN controller 10 is sent not only to a destination (not shown), but also to the comparator 14. The CAN redundant controller 12 is configured to send data to the comparator 14. The comparator 14 compares the received data from the CAN controller 10 and the CAN redundant controller 12. If they are consistent, it indicates that the CAN controller 10 works normally, otherwise, it indicates abnormal communication. In case of abnormal communication, the comparator 14 will send out a safety interrupt signal to indicate that the signals of the CAN controller 10 and the CAN redundant controller 12 are inconsistent, so as to inform of possible communication faults.

Figure 2:
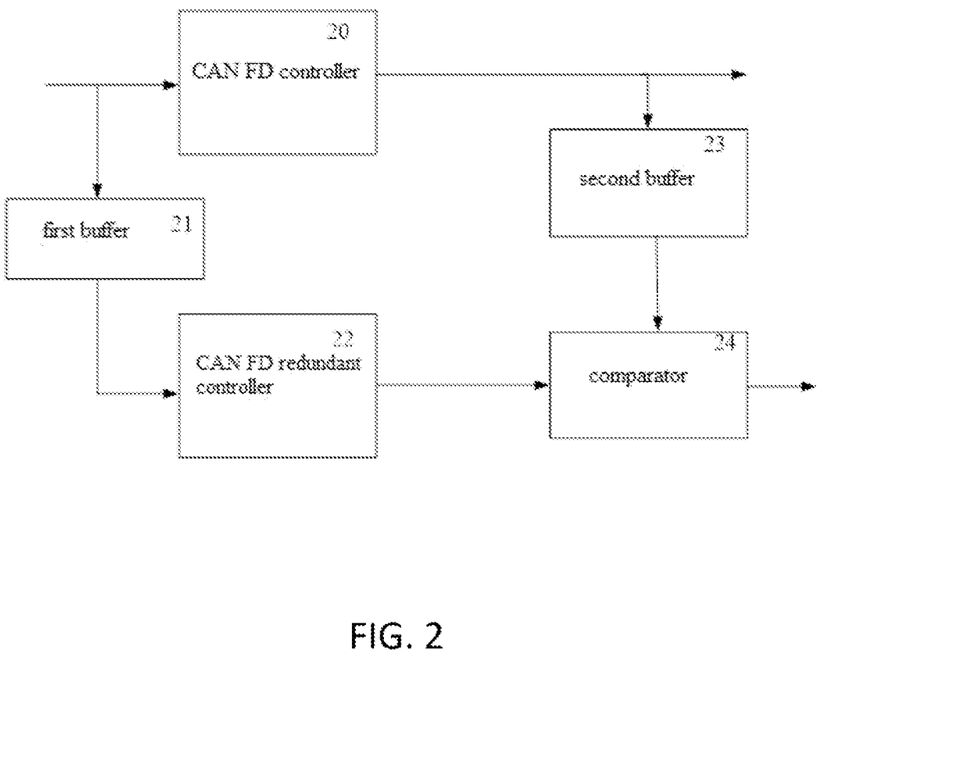
FIG. 2 is a structural diagram of a communication system 2 based on CAN FD bus according to an example of this current disclosure.

In the communication system based on the CAN bus illustrated in FIG. 1, when any one of the CAN controller 10 and the CAN redundant controller 12 is abnormal, the abnormality can be detected through the comparison operation of the comparator 14. However, if the two controllers 10 and 20 and/or corresponding communication lines with redundant control have the same problems, such as the same logic errors, the communication system shown in FIG. 1 cannot detect such problems.

FIG. 2 is a structural diagram of a communication system 2 based on CAN FD bus according to an example of this disclosure. As shown in the figure, the communication system 2 based on CAN FD bus includes a CAN FD controller 20, a CAN FD redundant controller 22, a comparator 24, a first buffer 21 and a second buffer 23. The CAN FD controller 20 receives an input signal input by the bus, which is also referred to herein as a bus input signal. The CAN FD controller 20 sends the received bus input signal, and the signal sent by the CAN FD controller 20 is also referred to as a bus output signal herein. The bus output signal sent by the CAN FD controller 20 is sent to a destination (not shown, for example, a processor) and a second buffer 23, respectively. The first buffer 21 is connected in parallel with the CAN FD controller 20. According to the example of the current disclosure, the bus input signal to be input into the CAN FD controller 20 is simultaneously input into the first buffer 21. The first buffer 21 is configured to buffer and output the data input therein after delaying a preset time. The output signal of the first buffer 21 is a bus output signal delayed by the preset time, and is sent to the CAN FD redundant controller 22. The CAN FD redundant controller 22 is configured to monitor the working condition of the CAN FD controller 20. It is set to have the same working logic as the CAN FD controller 20. In other words, the CAN FD redundant controller 22 is a redundant backup of the CAN FD controller 20. Compared with the CAN FD controller 20, the input signal entering the CAN FD redundant controller 22 is later than the central input signal input into the CAN FD controller 20 by the preset time. According to the example of this disclosure, the preset time is an integer multiple of the duty cycle of the CAN FD bus controller. In some examples of this disclosure, the preset time is 2 or more times the duty cycle of the CAN FD bus controller. The signal output via the CAN FD redundant controller 22 is referred to herein as a bus redundant input signal to be distinguished from the bus output signal. The bus redundant input signal is sent to the comparator 24. The comparator 24 also receives the data sent by the second buffer 23. The second buffer 23 receives the bus output signal sent by the CAN FD controller 20, and sends it to the comparator 24 after being delayed by the preset time. The preset time delayed by the second buffer 23 is the same as that of the first buffer 21. Therefore, that comparator 24 receives the bus redundant output signal from the CAN FD redundant controller 22 and the bus output signal delayed by the preset time via the second buffer 23. The comparator 24 compares the received bus redundant output signal with the bus output signal delayed by the preset time, and the comparator 24 is configured to send an abnormality indication signal when the signal directly from the controller 22 and the signal indirectly from the controller 20 are different. In some examples of this disclosure, the abnormality indication signal is an interrupt signal.

In the communication system 2 based on CAN FD bus illustrated in FIG. 2, the setting of the first buffer and the setting of the second buffer cause a cycle difference between the signal entering the CAN FD redundant controller 22 and the signal entering the CAN FD controller 20. Before the signals output from the CAN FD redundant controller 22 and the CAN FD controller 20 enter the comparator 24 for comparison, the signal output from the CAN FD controller 20 enter the second buffer and is delayed by the same time as the first buffer. In this way, the input signals that are still matched with each other are compared in the comparator 24, but at the same time, the situation that the redundant controller and the normal controller and/or the corresponding communication lines with redundant control in the two communication systems of FIG. 1 and FIG. 2 have the same problems and cannot be detected by the whole bus communication system is avoided.

Figure 3:
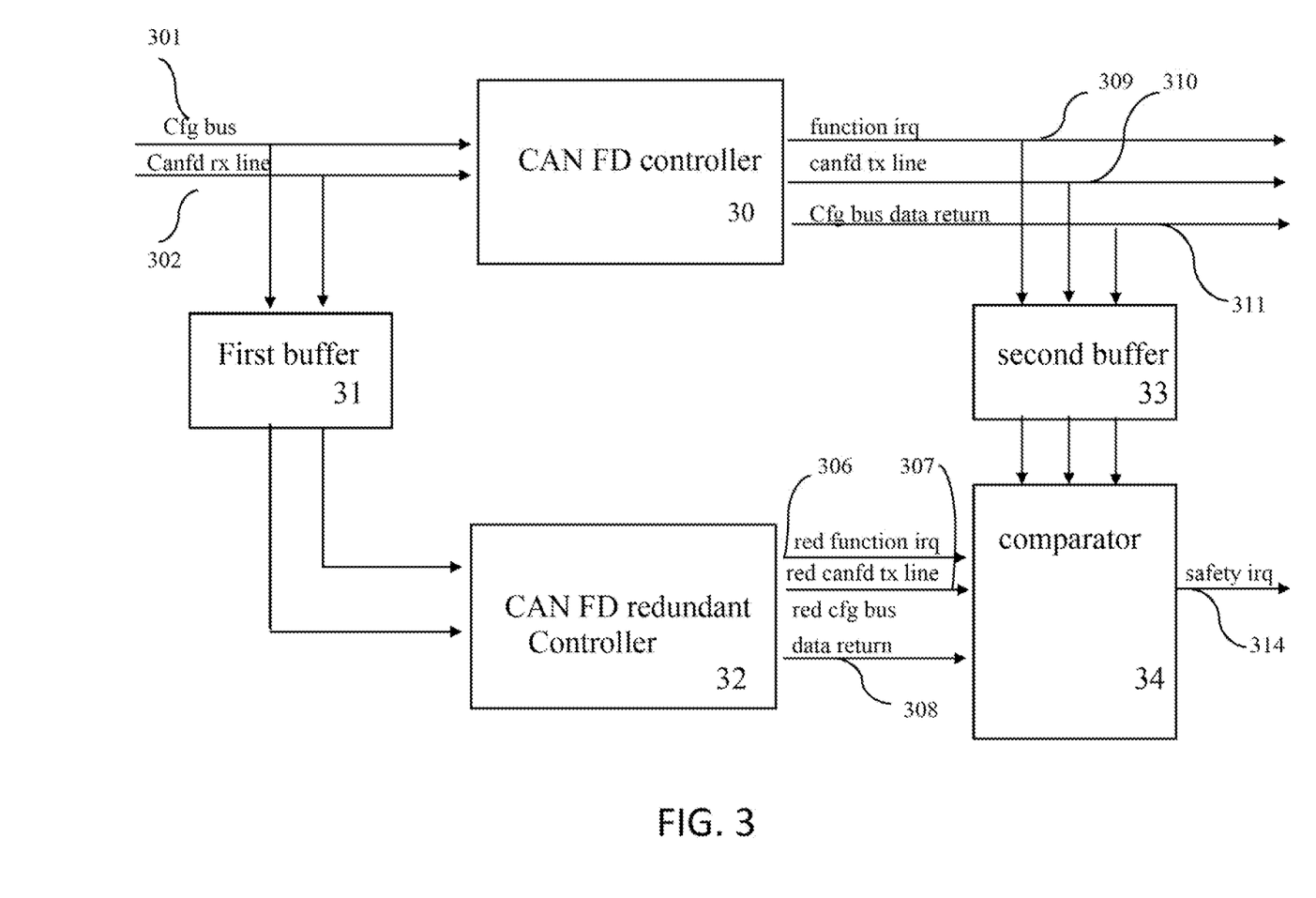
FIG. 3 is a schematic diagram of a specific structure 3 of a communication system based on CAN FD bus according to an example of this current disclosure.

FIG. 3 is a structural diagram of a specific structure 3 of a communication system based on CAN FD bus according to an example of this disclosure. Similar to the system 2 shown in FIG. 2, the system 3 shown in FIG. 3 includes a CAN FD controller 30, a CAN FD redundant controller 32, a comparator 34, a first buffer 31 and a second buffer 33. A line 301 connected to the CAN FD controller 30 is a configuring bus for the CAN FD controller 30, through which reading and writing of registers inside the CAN FD controller 30 can be controlled. A line 302 connected to the CAN FD controller 30 is an information receiving bus of the CAN FD controller 30, which is mounted in the CAN FD bus network for the CAN FD controller 30 to receive information. The first buffer 31 is an input buffer, and is configured to receive the signals transmitted by the lines 301 and 302 and delay them by T cycles, where T is an integer greater than or equal to 2. The signal delayed by the first buffer 31 is transmitted to the CAN FD redundant controller 32. The CAN FD redundant controller 32 is a redundant backup of the CAN FD controller 30. Output lines of the CAN FD controller 30 include a protocol function interrupt line 309 for the controller, a transmission line 310 for the transmission of the controller, and a readout data line 311. Interrupt signals transmitted by the line 309 include interrupt signals such as successful information reception interrupt, successful information transmission interrupt and protocol security interrupt. The interrupt signals transmitted by the line 309 are transmitted to both an interrupt processing module (not shown) and the second buffer 33. The line 310 is a transmission communication bus for the CAN FD controller 30, and is mounted in the CAN FD bus network. The data of the line 310 is simultaneously transmitted to the second buffer 33. The line 311 is a readout data bus of the configuring bus for the CAN FD controller 30, which transmits the readout data to a processor (not shown) and also to the second buffer 33. The second buffer 33 delays the signal input thereto by T cycles, and then transmits it to the comparator 34. Output lines for the CAN FD redundant controller 32 are similar to those for the CAN FD controller 30, and include a protocol function interrupt line 306 for the redundant controller, a transmission line 307 for the transmission of the redundant controller, and a readout data line 308 for the redundant controller. Interrupt signals transmitted by the line 306 include interrupt signals such as successful information reception interrupt, successful information transmission interrupt and protocol security interrupt. The line 306 transmits an interrupt signal to the comparator 34. The line 307 is a transmission communication bus for the CAN FD redundant controller 32, and the data of the line 310 is transmitted to the comparator 34. The line 308 is a readout data bus of the configuring bus for the CAN FD redundant controller 32, which transmits the readout data to the comparator 34. The comparator 34 compares the corresponding signals received from the CAN FD redundant controller 32 and the second buffer 33. The comparator 34 includes an output line 314, which is configured to send out a safety interrupt signal when the comparison result is that the signal input to comparator 34 from the CAN FD redundant controller 32 is inconsistent with the corresponding signal input to the comparator 34 from the second buffer 33.

Figure 4:
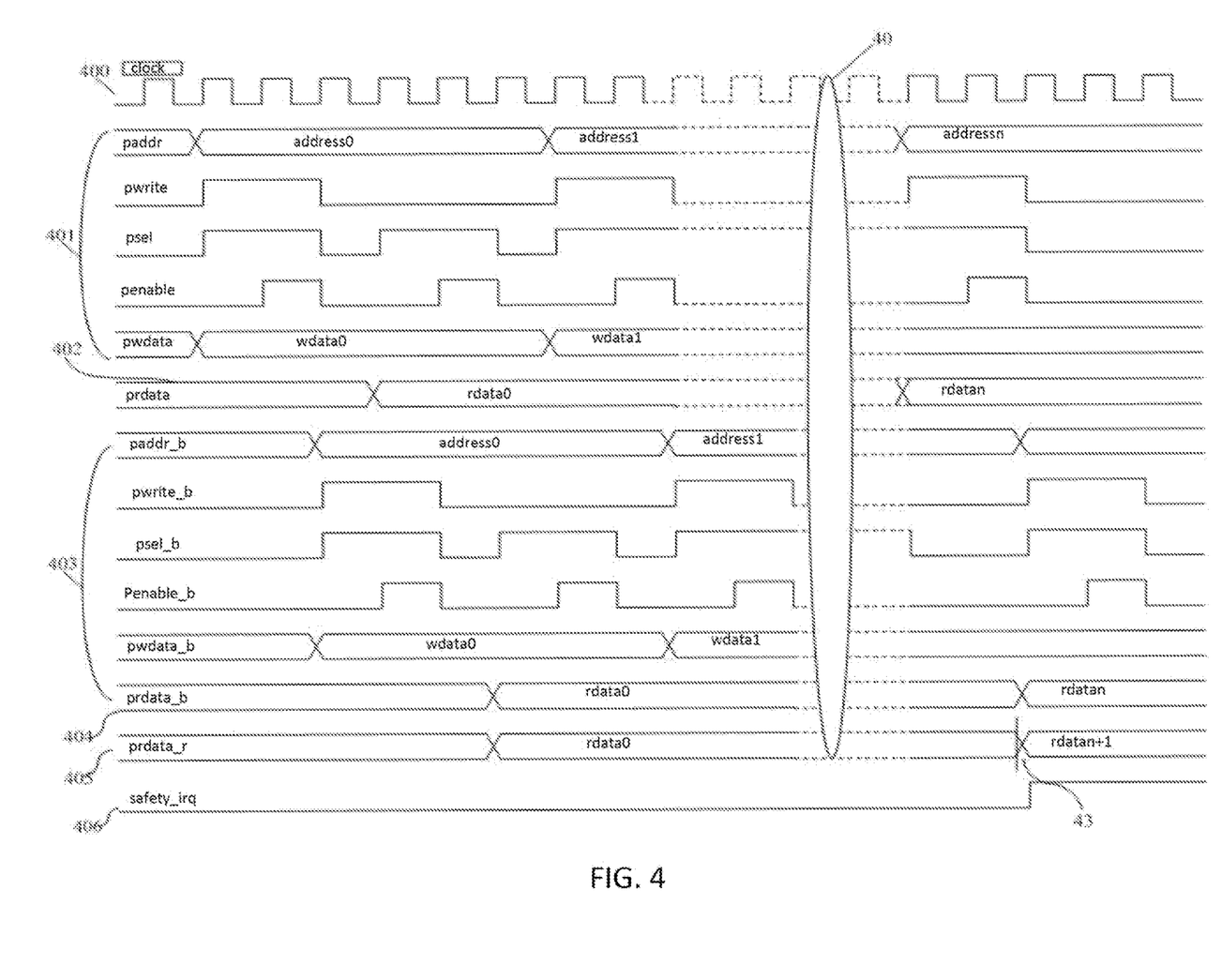
FIG. 4 is a configuration timing diagram for the communication system based on the CAN FD bus of FIG. 3 according to an example of the current disclosure.
Figure 5:
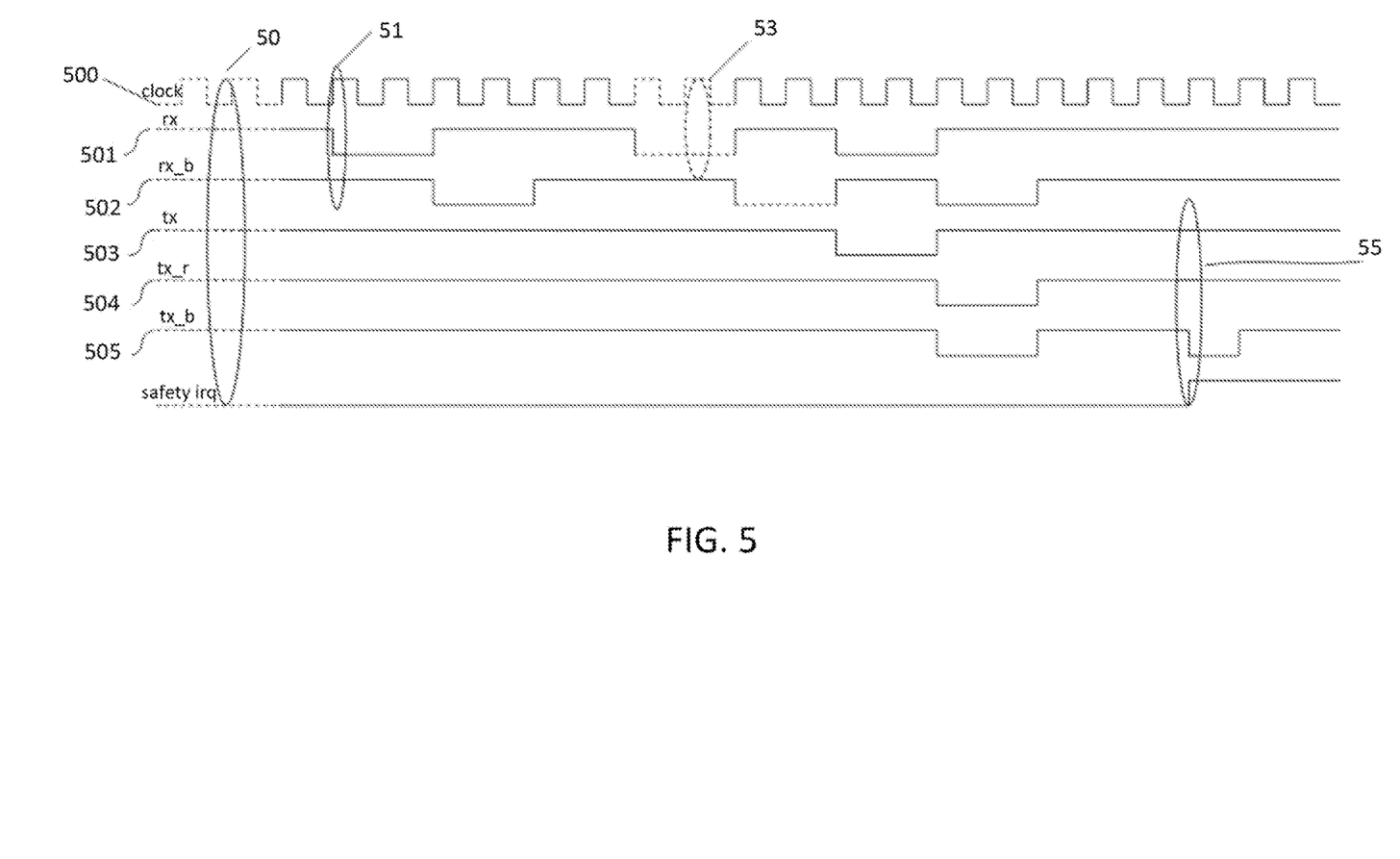
FIG. 5 is an information receiving and transmitting timing diagram for the communication system based on the CAN FD bus of FIG. 3 according to an example of the current disclosure.

FIG. 4 is a configuration timing diagram of the communication system based on the CAN FD bus of FIG. 3 according to an example of the current disclosure. FIG. 5 is an information receiving and transmitting timing diagram of the communication system based on the CAN FD bus of FIG. 3 according to an example of the current disclosure.

In the timing diagram illustrated in FIG. 4, a clock 400 is a work clock of the CAN FD controller 30 and the CAN FD redundant controller 30. An APB (Advanced Peripheral Bus) 401 is a configuring bus, which includes signals related to the APB. The CAN FD controller 30 is configured through this bus. A buffered configuring bus 403, i.e., a buffered APB configuring bus, includes buffered related signals for configuring the CAN FD redundant controller 32. A ellipse 40 in the figure indicates that many configurations are omitted here. A prdata 402 is an APB readout data, which is output by the line 311 of the CAN FD controller 30. A prdata_b 404 is buffered and delayed readout data of the APB readout data, that is, the readout data of the prdata after passing through the comparator 34. The prdata_r 405 is APB readout data of the CAN FD redundant controller 32, that is, the data output by the line 308. A safety_irq 406 is a safety interrupt signal. When the prdata_b is inconsistent with the prdata_r (indicated by reference numeral 43 in the figure), the comparator 34 generates a safety interrupt signal, indicating that there may be a problem with the internal circuit of the CAN FD.

FIG. 5 is an information receiving timing diagram during normal operation of CAN FD, in which a safety interrupt signal will be generated when there is a circuit problem. As shown in the figure, a clock 500 indicates that the CAN FD controller 30 and the CAN FD redundant controller 30 are configured to work, wherein the clock 500 is a clock bus the same as the clock 400 in FIG. 4. Rx 501 is a signal received by the CAN FD controller 30, that is, a signal received through line 302. Rx_b 502 is a buffered signal of the rx signal after being buffered by the first buffer 31, which will be transmitted to the CAN FD redundant controller 30. Tx 503 is a signal transmitted by the CAN FD controller 30, that is, a signal transmitted through the line 310. Tx_r 504 is a signal transmitted by the CAN FD redundant controller 30, and is transmitted to the comparator 24. Tx_b 505 is a buffered output signal of a signal transmitted to the second buffer 33 by the CAN FD controller 30, and the signal will be transmitted to the comparator 24. The part indicated by an ellipse 50 in FIG. 5 is the configuration of CAN FD. The part indicated by an ellipse 51 indicates that the CAN FD controller 30 starts to receive communication data. The part indicated by an ellipse 53 indicates that one frame of data has not been received yet and is omitted. The part indicated by an ellipse 55 indicates that after comparing the inputs from the second buffer 33 and the CAN FD redundant controller 32 by the comparator 34, the comparison result is inconsistent, generating in a safety interrupt signal, which presents that there may be a problem with the internal logic circuit.

Figure 6:
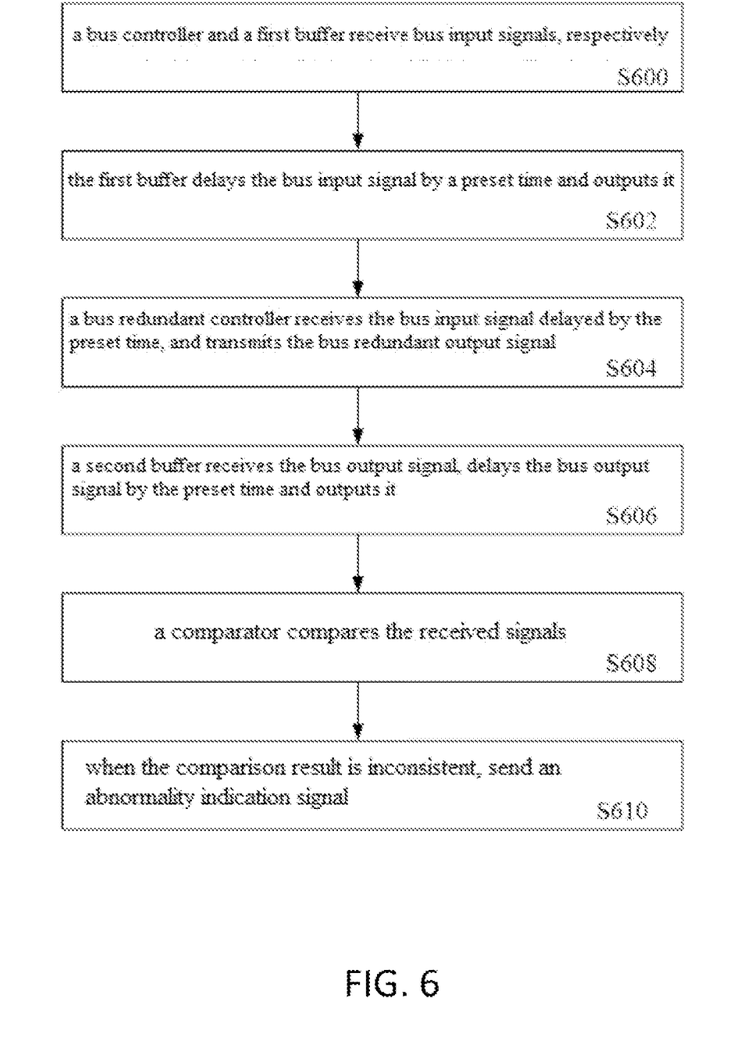
FIG. 6 is a flowchart of a method for monitoring abnormality of a CAN FD controller according to an example of the current disclosure.

FIG. 6 is a flowchart of a method for monitoring abnormality of a CAN FD controller according to an example of the current disclosure. The method is applied to monitor bus communication system, for example, the system shown in FIG. 2. The method according to an example of the current disclosure will be explained with reference to FIG. 6 in conjunction with FIG. 2.

At step S600, the bus controller 20 and the first buffer 21 receive bus input signals, respectively. In step S602, the first buffer 21 delays the bus input signal by a preset time and outputs it. The preset time is the same as explained above with reference to FIG. 2. At step S604, the bus redundant controller 22 receives the bus input signal delayed by the preset time from the first buffer 21, and transmits the bus redundant output signal. At step S606, the second buffer 23 receives the bus output signal transmitted by the bus controller 20, delays the bus output signal by the preset time and outputs it. At step S608, the comparator 24 receives the bus redundant output signal and the bus output signal delayed by the preset time output by the second buffer 23, and compares them. At step S610, when the comparison result is inconsistent, the comparator 24 generates an abnormal signal. The abnormal signal is, for example, an interrupt signal.

The method shown in FIG. 6 can also be applied to the system shown in FIG. 3 or other systems that include a controller and a redundant backup controller, so they will not be described in detail.

According to the disclosure, a System-on-chip (SOC) is also provided. The system-on-chip includes any of the bus-based communication systems described above. The system-on-chip can be implemented as a chip.

According to the disclosure, it provides a vehicle including any of the bus-based communication systems described above, or including the system-on-chip described herein.

In the examples described above in this disclosure, a pre-buffer (first buffer) is provided between the controller 20, 30 and the redundant controller 22, 32, so that there is a certain time delay between the input signals entering the controller 20, 30 and the redundant controller 22, 32. At the same time, the setting of the post buffer (second buffer) makes the signals entering the comparator be the signals at the same timing. Therefore, when the same logic error occurs between the controller and the redundant backup controller, it can be detected.

The above-mentioned embodiments only express several embodiments of the disclosure, and their descriptions are specific and detailed, but they cannot be understood as limiting the scope of the current disclosure. It should be pointed out that, for those of ordinary skill in the art, without departing from the concept of the current disclosure, several modifications and improvements can be made, which belong to the protection scope of the current disclosure. Therefore, the scope of protection of the current disclosure shall be subject to the appended claims.

What is claimed is:

1. A bus-based communication system comprises:
    a bus controller is configured to receive a bus input signal and send a bus output signal;
    a first buffer is connected in parallel with the bus controller to receive the bus input signal and is configured to output the bus input signal after a preset time,
    a bus redundant controller is connected to an output terminal of the first buffer and is configured to receive the bus output signal delayed by at least T cycles output by the first buffer and outputs a bus redundant output signal;
    a second buffer is configured to receive the bus output signal sent by the bus controller and outputs the bus output signal delayed by the preset time; and
    a comparator is connected to the second buffer and the bus redundant controller, respectively, and is configured to receive the bus redundant output signal and the bus output signal delayed by the preset time, the comparator generates a signal representing abnormality when the bus redundant output signal is different from the received bus output signal delayed by the preset time.

2. The bus-based communication system of claim 1, wherein the preset time is two or more duty cycles of the bus controller.

3. The bus-based communication system of claim 1, wherein the signal representing abnormality is an interrupt signal generated by the comparator.

4. The bus-based communication system of claim 1, wherein the bus redundant controller is a redundant backup of the bus controller.

5. The bus-based communication system of claim 1, wherein the bus is a Controller Area Network Flexible Data bus.

6. The bus-based communication system of claim 1, wherein the bus is a Controller Area Network Flexible Data bus.

7. A method for monitoring a bus communication system comprising of a bus controller, a first buffer, a bus redundant controller, a second buffer and a comparator, wherein the first buffer is connected in parallel with the bus controller, the bus redundant controller is arranged between the first buffer and the comparator, and the second buffer is arranged between the bus controller and the comparator, comprising:
    the bus controller and the first buffer respectively receive a bus input signal;
    the first buffer outputs the bus input signal delayed by a preset time and outputs a bus output signal delayed by the preset time;
    the bus redundant controller receives the bus input signal delayed by the preset time sent by the first buffer and sends a bus redundant output signal;
    the second buffer receives the bus output signal and outputs the bus output signal delayed by the preset time;
    the comparator receives the bus redundant output signal and the bus output signal delayed by the preset time, and compares then;
    when the comparison result between the bus redundant output signal and the bus output signal delayed by the preset time is inconsistent, the comparator generates a signal representing abnormality.

8. The method for monitoring the bus communication system of claim 7, wherein the preset time is two or more duty cycles of the bus controller.

9. The method for monitoring the bus communication system of claim 7, wherein the signal representing abnormality is an interrupt signal.

10. A system-on-chip comprises the bus-based communication system wherein the bus-based communication system comprises:
    a bus controller is configured to receive a bus input signal and send a bus output signal;
    a first buffer is connected in parallel with the bus controller to receive the bus input signal and is configured to output the bus input signal after a preset time,
    a bus redundant controller is connected to an output terminal of the first buffer and is configured to receive the bus output signal delayed by at least T cycles output by the first buffer and outputs a bus redundant output signal;
    a second buffer is configured to receive the bus output signal sent by the bus controller and outputs the bus output signal delayed by the preset time; and
    a comparator is connected to the second buffer and the bus redundant controller, respectively, and is configured to receive the bus redundant output signal and the bus output signal delayed by the preset time, the comparator generates a signal representing abnormality when the bus redundant output signal is different from the received bus output signal delayed by the preset time.

11. The system-on-chip of claim 10, wherein the preset time is two or more duty cycles of the bus controller.

12. The system-on-chip of claim 10, wherein the signal represents the abnormality of the bus redundant controller signal representing abnormality is an interrupt signal generated by the comparator.

13. The system-on-chip of claim 10, wherein the bus redundant controller is a redundant backup of the bus controller.

14. The system-on-chip of claim 10, wherein the bus is a Controller Area Network (CAN) bus.

15. The system-on-chip of claim 10, wherein the bus is a Controller Area Network Flexible Data bus.

16. A vehicle adopting the bus-based communication system wherein the bus-based communication system comprises:

a bus controller is configured to receive a bus input signal and sends a bus output signal;

a first buffer is connected in parallel with the bus controller to receive the bus input signal and is configured to output the bus input signal after a preset time, a bus redundant controller is connected to an output terminal of the first buffer and is configured to receive the bus output signal delayed by at least T cycles output by the first buffer and outputs a bus redundant output signal;

a second buffer is configured to receive the bus output signal sent by the bus controller and outputs the bus output signal delayed by the preset time; and a comparator is connected to the second buffer and the bus redundant controller, respectively, and is configured to receive the bus redundant output signal and the bus output signal delayed by the preset time, the comparator generates a signal representing abnormality when the bus redundant output signal is different from the received bus output signal delayed by the preset time.

17. The vehicle of claim 16, wherein the preset time is two or more duty cycles of the bus controller.

18. The vehicle of claim 16, wherein the signal represents the abnormality of the bus redundant controller is an interrupt signal generated by the comparator.

19. The vehicle of claim 16, wherein the bus redundant controller is a redundant backup of the bus controller.

20. The vehicle of claim 16, wherein the bus is a Controller Area Network Flexible Data bus.

* * * * *